Jan. 2, 1951
E. O. HANSON
2,536,743
DRAFTING INSTRUMENT
Filed Aug. 14, 1947
3 Sheets-Sheet 1
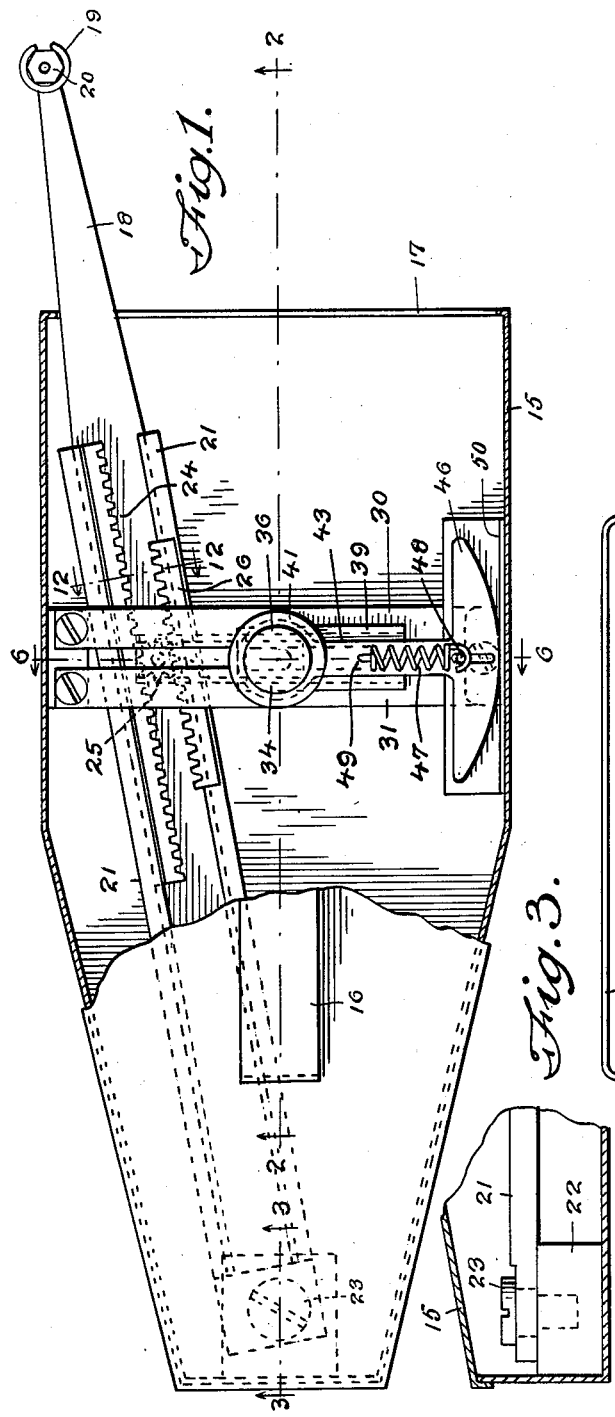
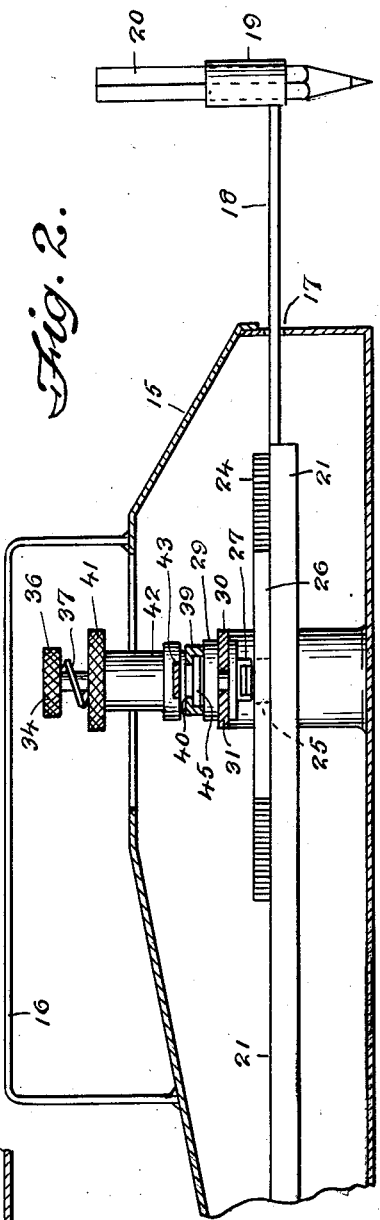
INVENTOR.
EDWIN O. HANSON
BY Victor J. Evans & Co.
ATTORNEYS

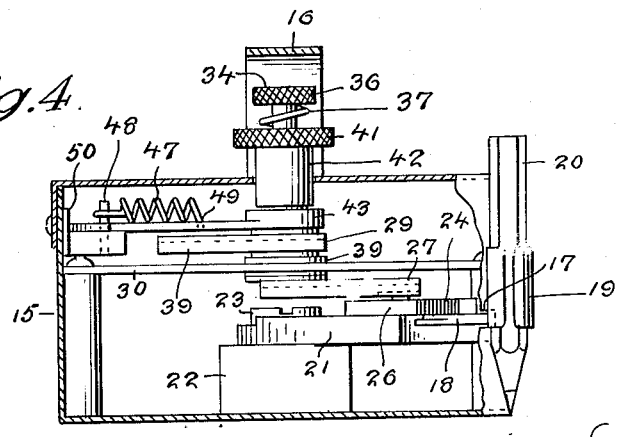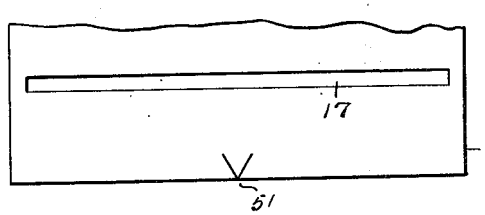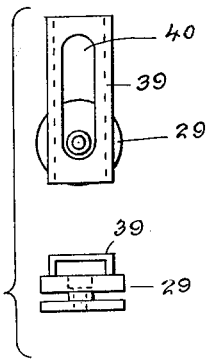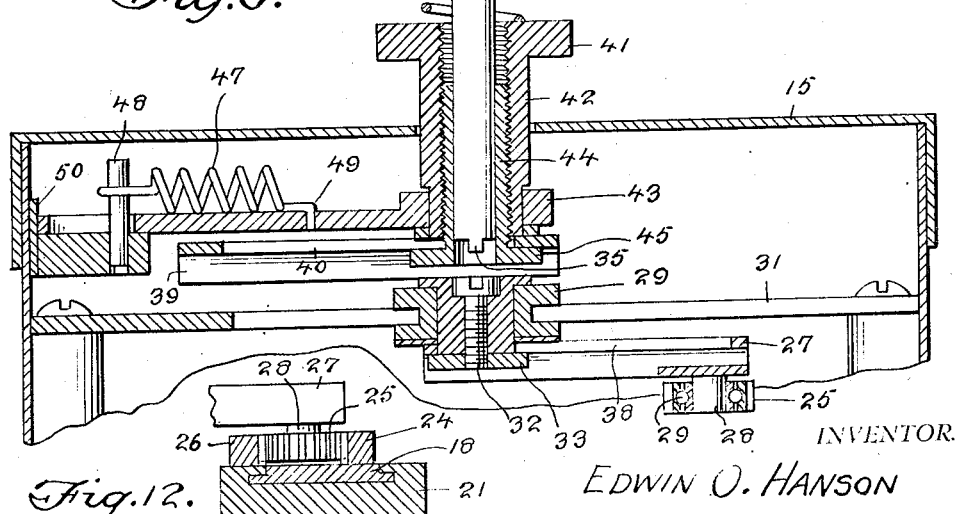

Jan. 2, 1951 E. O. HANSON 2,536,743
DRAFTING INSTRUMENT
Filed Aug. 14, 1947 3 Sheets-Sheet 3
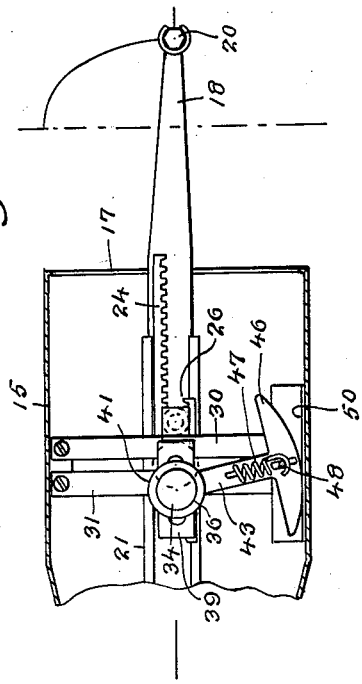
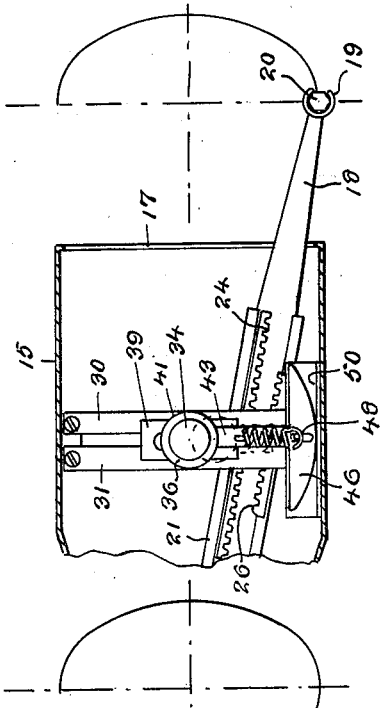
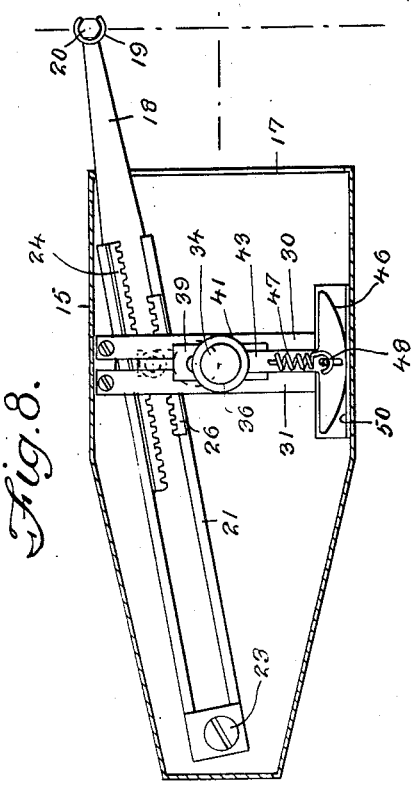
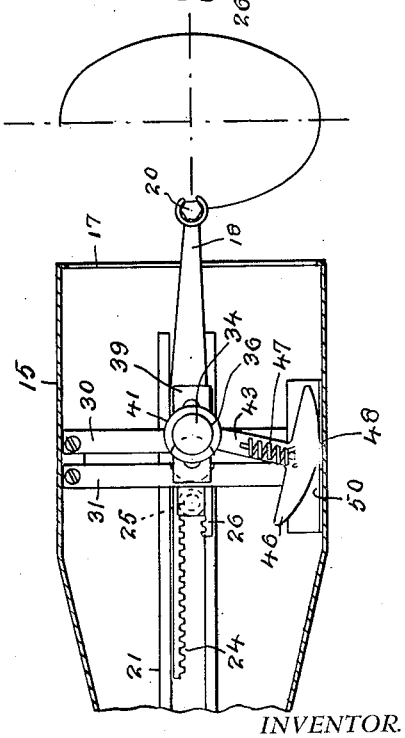
INVENTOR.
EDWIN O. HANSON
BY Victor J. Evans & Co.
ATTORNEYS Patented Jan. 2, 1951

2,536,743

UNITED STATES PATENT OFFICE 2,536,743

DRAFTING INSTRUMENT

Edwin Osvale Hanson, Jacksonville, Fla.

Application August 14, 1947, Serial No. 768,601

2 Claims. (Cl. 33—31)

This invention relates to drafting instruments and more particularly to instruments adapted to draw ovals or approximate ellipses.

An object of the invention is to provide an instrument of this character which will draw an approximate ellipse upon rotation of a single actuating member or which may be used to guide a drafting instrument causing it to follow an elliptical path.

A further object of the invention is the provision of such an instrument which may be readily and conveniently adjusted in accordance with the center and the major and minor semi-axes of the ellipse and will draw the approximate ellipse in accordance with these adjustments.

Still another object of the invention is the provision of a device of this type in which the adjustment settings may be quickly and accurately established.

A further object is the provision of a drafting instrument for drawing approximate ellipses which is simple in construction and economical to manufacture and which will give a sufficiently accurate approximation of a true ellipse for most practical purposes.

Other and further objects will become apparent upon reading the following specification together with the accompanying drawing forming a part hereof.

Referring to the drawing:

Fig. 1 is a plan view, partly broken away.

Fig. 2 is a fragmentary sectional view in elevation taken along the line 2—2 of Fig. 1, looking in the direction of the arrows.

Fig. 3 is a fragmentary sectional view in elevation showing a part of the instrument taken along the line 3—3 of Fig. 1.

Fig. 4 is an end view, partly broken away.

Fig. 5 is a fragmentary end view of the cover of the instrument.

Fig. 6 is an enlarged fragmentary sectional view.

Fig. 7 is an enlarged view of the construction of a part of the instrument.

Figs. 8, 9, 10 and 11 are sectional plan views illustrating successive steps in the drawing of an ellipse by means of the instrument.

Fig. 12 is an enlarged sectional view taken along the line 12—12 of Fig. 1.

Referring to Fig. 1, the instrument comprises a housing 15 provided with a handle 16 and having a slotted opening 17 at one end thereof. A guide arm 18 is provided with a holding portion 19 which is shown supporting a pencil 20. Pencil 20 may be replaced by a suitable drawing pen or other line tracing implement as desired.

The guide arm 18 is slidably mounted within another arm 21 and this latter arm is pivotally secured to a fixed block 22 by a shouldered screw 23 which permits free rotation of arms 18 and 21. Slideable guide arm 18 is provided with a rack 24 which is in engagement with a pinion 25, the other side of pinion 25 being in engagement with another rack 26 carried by swinging arm 21. Pinion 25 is freely rotatably mounted on a rotary arm 27 by a pin 28 carrying a ball bearing 29 on which pinion 25 revolves. It will be seen that motion of pin 28 will cause extension or retraction of guide arm 18 depending upon whether the movement of pin 28 is away from or toward pivot screw 23. The pinion arrangement has the effect of multiplying the movement by a factor of two insofar as motion of pin 28 longitudinally with respect to arms 18 and 21 is concerned. If desired, the pinion may be omitted and the pin 28 may be connected through a suitable bearing directly to guide arm 18, the guide arm 18 being slidably mounted arm 21 as in the construction illustrated.

Rotary arm 27 is secured to a guide collar 29 which is freely slidable transversely along guide members 30 and 31. Rotary arm 27 may be adjusted radially with respect to guide collar 29 in order to determine the dimensions and eccentricity of the ellipse but may not rotate with respect to the guide collar 29. The radial adjustment may be made by loosening screw 32 which is in threaded engagement with a nut member 33. With the parts in proper position, this may be accomplished by means of an adjusting member 34 having a screwdriver tip 35 and a knurled flange 36. Member 34 is normally held out of engagement with screw 32 by the action of compression spring 37 which keeps screwdriver tip 35 retracted so that it will not interfere with the operation of the instrument. Rotary arm 27 is provided with a slot 38. Screw 32 may assume any position within the slot 38 thereby affording a range of adjustment determined by the length of the slot.

Fixedly secured to the upper side of sliding guide collar 29 is a further slotted rotary arm 39, the slot being indicated at 40. A knurled operating knob 41 is formed on a hollow threaded guide shaft 42 which is freely rotatable at its lower end in an opening in guide member 43. A flanged threaded bushing 44 passes through the slot 40 of rotary arm 39 and may be tightened to bring the flange 45 into firm engagement with the sides of rotary arm 39 to fix its position relative to guide shaft 42. The adjusting member 34 is slidable within the bushing 44 for engagement with screw 32.

Guide member 43 is provided with a rocker like cam surface 46 which is so shaped that in the course of the rocking action, the path of travel of guide shaft 42 will be substantially in a straight longitudinal line along the center of the instrument. A coiled tension spring 47 engages a projecting fixed pin 48 which engages guide member 43 and spring 47 and has its opposite end in engagement with guide member 43 at 49. Tension spring 47 thus keeps rocker surface 46 in firm but yielding engagement with the fixed flat surface 50 which is secured to housing 15.

It will thus be seen that the two rotary arms 27 and 39 extend in opposite directions and that the center of pinion 25, the center of guide collar 29 and the center of guide shaft 42 will always lie in substantially a vertical plane. The distances of the effective free ends of the rotary arms from guide collar 29 are adjustable by reason of the slot 38 in arm 27 and the slot 40 in arm 39. Two of these centers can travel only in straight lines. Guide collar 29 can travel only transversely of the instrument being confined within the slot between members 30 and 31. Guide shaft 42 can travel only longitudinally by reason of the linear guiding action of guide member 43 in which it is held. This provides two points on a line which two points can travel only along a pair of mutually perpendicular axes and a third point which controls the tracing of the curve disposed on the same line, the distances among the three points being fixed by the adjustments described.

It can be shown mathematically that each point on the line will describe a true ellipse as the two confined points travel in their mutually perpendicular paths. Accordingly, it follows that the pinion 25 will travel in an elliptical path.

The arms 18 and 21 are shown pivoted at 23 thus modifying the path of travel of pencil 29 by reason of the circular motion imposed by the fixed pivot. Because of the large radius shown, the distortion produced will not be so great as to cause difficulty in most instances and the approximation of an ellipse will be sufficiently accurate for most purposes. If desired, however, this deviation from true elliptical shape may be avoided by the substitution of a pantograph action or other well known rectilinear mechanism in place of the radial arms 18 and 21.

In operation, an index mark 51 appearing on the exterior of housing 15 is positioned on the longitudinal line of travel of the center or guide shaft 42 as guided by member 43. This index mark and a corresponding index mark at the rear of the instrument, not shown, are aligned with the corresponding axis of the ellipse to be drawn and the adjustments are set. It is necessary that guide shaft 42 be centrally aligned with guide collar 29 in making the first or longitudinal adjustment in order that access may be had to screw 32 by means of adjusting member 34. After this setting has been completed, guide shaft 42 may then be placed in the desired position along slot 40 of rotary arm 39 to provide for the transverse semi-axis. The ellipse may be drawn by moving the pencil subject to the guiding action of the device or by rotating the guide shaft 42 and the device may be constructed to favor either type of operation. The structural details involved in either case will be apparent to those skilled in the art.

Referring to Fig. 8, the instrument is shown at the start of an ellipse. Fig. 9 shows the ellipse one quarter completed. Fig. 10 shows the instrument with the ellipse half completed and Fig. 11 shows the ellipse three quarters complete. When the ellipse has been completed the parts will be in the same relative positions as indicated in Fig. 8, the apparatus having returned to its starting position. These figures show that the transverse dimension of the ellipse is determined by the position of the center of guide shaft 42 with respect to the center of guide collar 29 and that the longitudinal dimension is determined by the distance between the centers of pinion 25 and guide collar 29. Limitations in the range of adjustability may require a particular one of these dimensions to determine either the major or minor axis of the ellipse.

Having fully described the invention, what is claimed is:

1. A drafting instrument comprising a pivotally mounted arm, a second arm carried by the pivotally mounted arm and slidable therein, a rack carried by each arm, the two racks being disposed to mesh with a common pinion, a rotary pivoted arm arranged to move the common pinion with the free end of said rotary arm, a collar member supporting the rotary arm at the pivoted end of said rotary arm, a pair of parallel arranged guiding members slidably supporting the collar member and permitting rectilinear motion thereof, a second pivoted rotary arm secured to the collar member, a second member engaging the second rotary arm at its free end and disposed to constrain movement of the free end of the rotary arm to a direction substantially perpendicular to the direction of motion of the collar member, and a line tracing member carried by the second arm.

2. An instrument as in claim 1 in which the distance between the pivoted end of each rotary arm secured to the collar member and the free end of each rotary arm is adjustable.

EDWIN OSVALE HANSON.

REFERENCES CITED

The following references are of record in the file of this patent:

UNITED STATES PATENTS

| Number | Name | Date |
|---|---|---|
| 165,385 | Toulmin | July 6, 1875 |
| 830,784 | Hanes et al. | Sept. 11, 1906 |
| 1,261,573 | McElwaine | Apr. 2, 1918 |
| 1,539,451 | Willis | May 6, 1925 |

FOREIGN PATENTS

| Number | Country | Date |
|---|---|---|
| 13,417 | Switzerland | Nov. 9, 1896 |